United States Patent
Aoyama

(10) Patent No.: US 11,498,618 B2
(45) Date of Patent: Nov. 15, 2022

(54) VEHICLE STEERING ASSIST DEVICE

(71) Applicant: SUBARU CORPORATION, Tokyo (JP)

(72) Inventor: Yuki Aoyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 247 days.

(21) Appl. No.: 15/931,196

(22) Filed: May 13, 2020

(65) Prior Publication Data

US 2021/0001922 A1    Jan. 7, 2021

(30) Foreign Application Priority Data

Jul. 5, 2019  (JP) .............................. JP2019-126410

(51) Int. Cl.
*B62D 6/10*     (2006.01)
*B62D 5/04*     (2006.01)

(52) U.S. Cl.
CPC .............. *B62D 6/10* (2013.01); *B62D 5/0463* (2013.01)

(58) Field of Classification Search
CPC ...... B62D 6/10; B62D 5/0463; B62D 15/025; B62D 1/286; B62D 6/007; B62D 6/002
See application file for complete search history.

(56) References Cited

U.S. PATENT DOCUMENTS

| | | | | |
|---|---|---|---|---|
| 5,913,913 A | * | 6/1999 | Okanoue | B62D 5/0484 180/404 |
| 6,212,453 B1 | * | 4/2001 | Kawagoe | B62D 5/0463 701/28 |

(Continued)

FOREIGN PATENT DOCUMENTS

| | | | | |
|---|---|---|---|---|
| CN | 102026863 A | * | 4/2011 | ........... B62D 5/0463 |
| CN | 102264593 A | * | 11/2011 | ........... B62D 15/025 |

(Continued)

OTHER PUBLICATIONS

"The prototype development of electronic control unit for electric power steering;" Bobbie T. Christian, Arief S. Rohman; P. of the Joint International Conference on Electric Vehicular Technology and Industrial, Mechanical, Electrical and Chemical Engineering (pp. 247-252); Nov. 1, 2015. (Year: 2015).*

(Continued)

*Primary Examiner* — Khoi H Tran
*Assistant Examiner* — Jorge O Peche
(74) *Attorney, Agent, or Firm* — McDermott Will & Emery LLP

(57) ABSTRACT

A vehicle steering assist device includes a first detector to detect steering torque by a driver's steering wheel operation, a first calculator to calculate assist steering torque for the detected steering torque, a second calculator to calculate target steering torque to perform steering control, a controller to switch the first calculator from an active state to an inactive state to limit an output of the assist steering torque when the second calculator is in an active state, an EPS torque setter to set EPS torque to drive an EPS motor based on outputs from the second calculator and the controller, and a second detector to detect a driver's holding state of a steering wheel. Even when the second calculator is in the active state, when the second detector detects that a driver holds the steering wheel, the controller switches the first calculator from the inactive state to the active state.

3 Claims, 11 Drawing Sheets

(56) References Cited

U.S. PATENT DOCUMENTS

| | | | |
|---|---|---|---|
| 7,894,956 B2* | 2/2011 | Kondo | B62D 1/28 |
| | | | 701/41 |
| 8,818,634 B2* | 8/2014 | Fujita | B62D 6/00 |
| | | | 701/41 |
| 8,880,316 B2* | 11/2014 | Nishikawa | B62D 15/025 |
| | | | 701/41 |
| 9,567,006 B2* | 2/2017 | Fu | B62D 15/025 |
| 10,081,389 B2* | 9/2018 | Okuda | B62D 6/00 |
| 10,167,014 B2* | 1/2019 | Maeda | B62D 6/008 |
| 10,710,582 B2* | 7/2020 | Ooba | B60W 40/10 |
| 2011/0264329 A1* | 10/2011 | Limpibunterng | B62D 5/0472 |
| | | | 701/41 |
| 2015/0375777 A1* | 12/2015 | Endo | B62D 5/0463 |
| | | | 701/41 |
| 2017/0015351 A1* | 1/2017 | Endo | B62D 5/0472 |
| 2017/0088175 A1* | 3/2017 | Okuda | B62D 6/00 |
| 2018/0037200 A1* | 2/2018 | Otake | B60T 13/12 |
| 2018/0037256 A1* | 2/2018 | Maeda | B62D 1/286 |
| 2020/0307685 A1* | 10/2020 | Akiyama | G05D 1/0246 |
| 2021/0001922 A1* | 1/2021 | Aoyama | B62D 15/025 |
| 2021/0291893 A1* | 9/2021 | Nozawa | B62D 15/029 |
| 2021/0371010 A1* | 12/2021 | Kojo | B62D 6/10 |
| 2022/0073138 A1* | 3/2022 | Herget | B62D 1/046 |

FOREIGN PATENT DOCUMENTS

| | | | | |
|---|---|---|---|---|
| CN | 105711588 A | * | 6/2016 | |
| CN | 112109799 A | * | 12/2020 | B60W 10/20 |
| CN | 112172913 A | * | 1/2021 | B62D 5/0463 |
| DE | 102013013568 A1 | * | 2/2015 | B60W 30/10 |
| DE | 102017207514 A1 | * | 11/2017 | B62D 15/0215 |
| DE | 102016215724 A1 | * | 2/2018 | |
| EP | 0805095 A2 | * | 11/1997 | |
| EP | 0805095 B1 | * | 5/2001 | |
| EP | 2676867 A2 | * | 12/2013 | B62D 5/0472 |
| EP | 3257727 A1 | * | 12/2017 | B60W 30/10 |
| JP | H0971250 A | * | 3/1997 | |
| JP | 2004175192 A | * | 6/2004 | B60T 8/175 |
| JP | 2004299491 A | * | 10/2004 | |
| JP | 2008120338 A | * | 5/2008 | |
| JP | 2009274475 A | * | 11/2009 | B62D 5/0463 |
| JP | 2010069907 A | * | 4/2010 | |
| JP | 2011057163 A | * | 3/2011 | |
| JP | 4749995 B2 | * | 8/2011 | |
| JP | 5381536 B2 | * | 1/2014 | |
| JP | 2015217722 A | * | 12/2015 | |
| JP | 2015217724 A | * | 12/2015 | |
| JP | 2016147542 A | * | 8/2016 | B62D 5/0463 |
| JP | 2016215864 A | * | 12/2016 | |
| JP | 2017-171224 A | | 9/2017 | |
| JP | 2017171224 A | * | 9/2017 | |
| JP | 2018008652 A | * | 1/2018 | |
| JP | 2021011190 A | * | 2/2021 | B62D 5/0463 |
| JP | 2021146919 A | * | 9/2021 | |
| JP | 2021165062 A | * | 10/2021 | B62D 5/0409 |
| JP | 2022021178 A | * | 2/2022 | |
| WO | WO-2004022409 A2 | * | 3/2004 | B60R 21/01552 |
| WO | WO-2012063919 A1 | * | 5/2012 | B62D 5/046 |
| WO | WO-2014167630 A1 | * | 10/2014 | B62D 5/0463 |
| WO | WO-2018025791 A | * | 2/2018 | B62D 1/286 |
| WO | WO-2018025791 A1 | * | 2/2018 | B62D 1/286 |
| WO | WO-2019171447 A1 | * | 9/2019 | B62D 15/025 |
| WO | WO-2020027066 A1 | * | 2/2020 | B62D 15/021 |

OTHER PUBLICATIONS

"Electric power steering with Permanent magnet synchronous motor drive used in automotive application;" Shriwastava, R.G., Diagavane, M.B.; 2011 1st International Conference on Electrical Energy Systems (pp. 145-148); Jan. 1, 2011. (Year: 2011).*

"Modeling and Simulation of the Electric Power Steering System;" Zeng Qun, Huang Juhua; 2009 Pacific-Asia Conference on Circuits, Communications and Systems (pp. 236-239); May 1, 2009. (Year: 2009).*

* cited by examiner

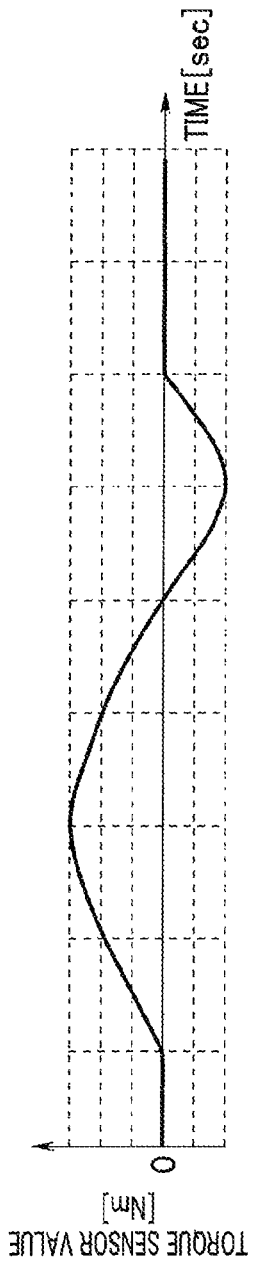
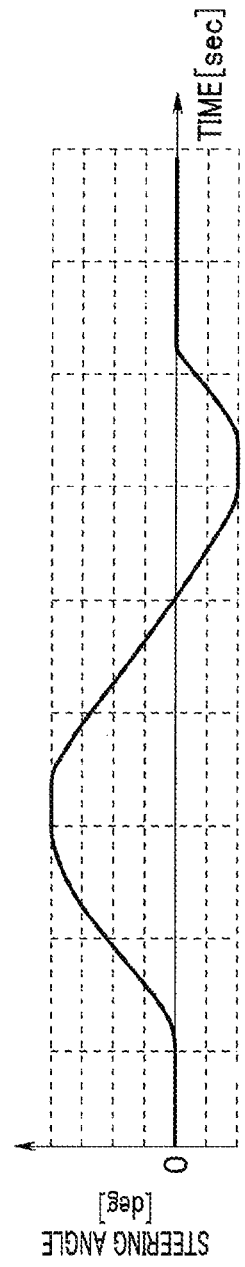
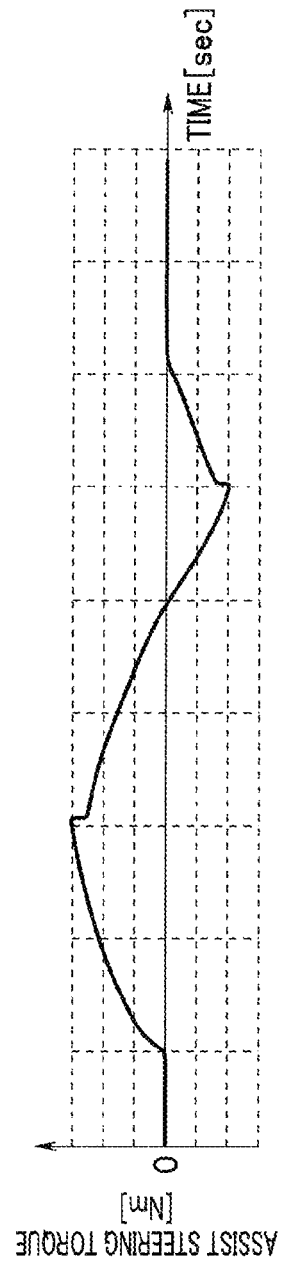

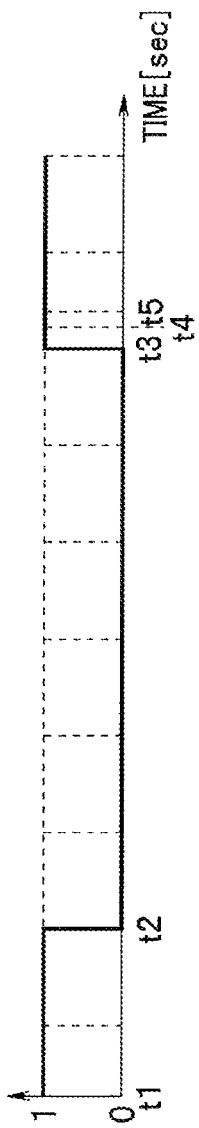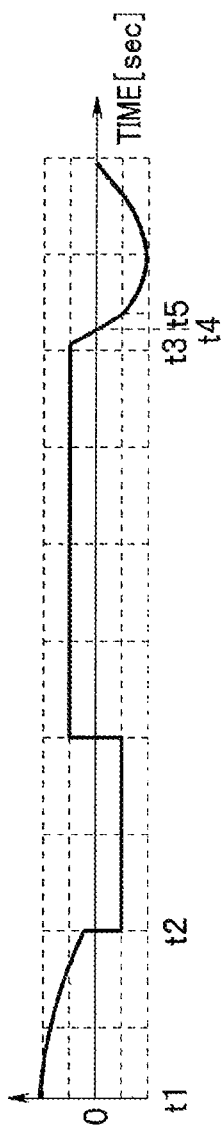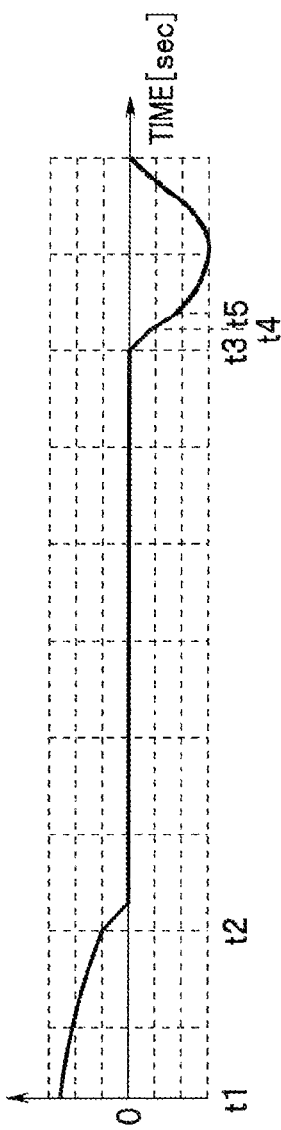

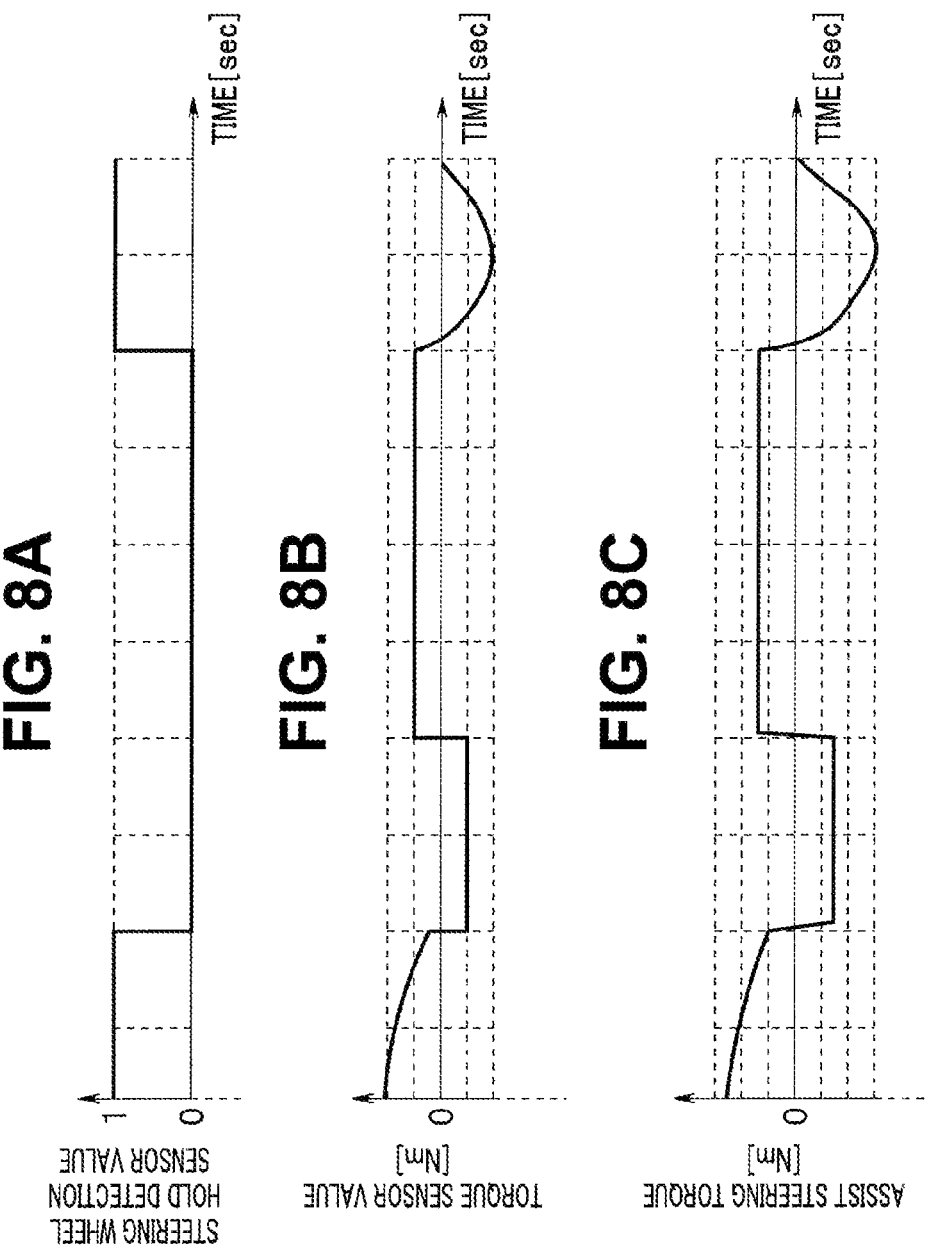

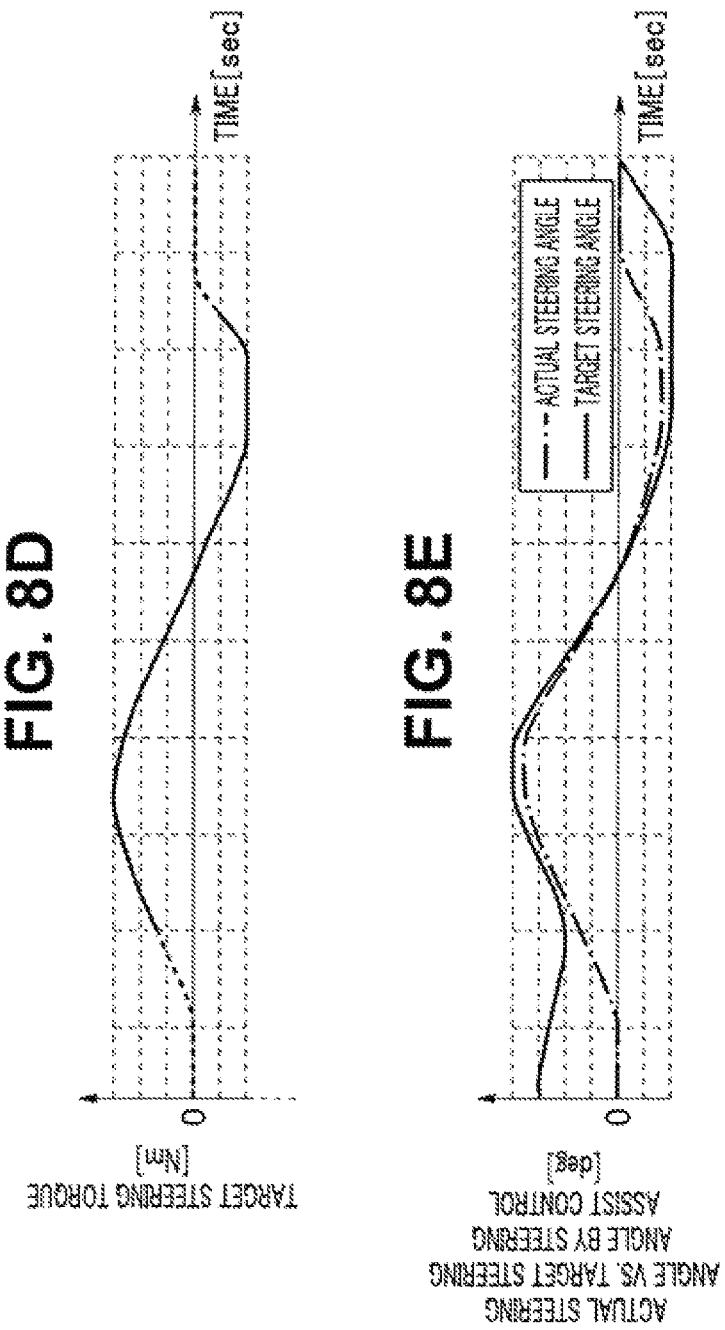

VEHICLE STEERING ASSIST DEVICE

CROSS-REFERENCE TO RELATED APPLICATIONS

The present application claims priority from Japanese Patent Application No. 2019-126410 filed on Jul. 5, 2019, the entire contents of which are hereby incorporated by reference.

BACKGROUND

The technology relates to a vehicle steering assist device that applies assist steering torque in response to steering by a driver to a steering system when driving assist control is in an inactive state.

Conventionally, a so-called electric power steering (EPS) device has been known in which steering force generated when a driver operates a steering wheel is assisted by assist steering torque generated by an electric motor.

There has been also known active lane keep (ALK) control in which predetermined positions in a lane (for example, a lane center) is set as a target traveling locus, and target steering torque is generated by an electric motor so that a vehicle travels along the target travel line, thereby performing steering assistance.

In recent years, some steering assist devices can keep an active state of steering assist control even when a driver releases a steering wheel. Such a driving assist device, when a driver holds the steering wheel to apply steering torque equal to or more than a predetermined value to a steering system, by determining an override, shifts the steering assist control to an inactive state, and applies only assist steering torque by electric power steering control to the steering system.

Also, in the steering assist control such as the active lane keep (ALK) control, the steering system on the steering wheel side simultaneously rotates when driving the electric motor, so that a steering torque sensor is affected by frictional force (static friction force) of the steering system. That is, when the target steering torque is transmitted to the steering system, the steering torque sensor detects a torque value in a direction opposite to a steering direction by the steering assist control as the steering torque by a driver due to an influence of the static frictional force of the steering system. When such a torque value is detected, the assist steering torque in a direction to offset the target steering torque calculated in the steering assist control is calculated in the electric power steering control.

In order to prevent generation of such unnecessary assist steering torque during the steering assist control and to improve controllability of the steering assist control, for example, Japanese Unexamined Patent Application Publication No. 2017-171224 (JP-A) discloses a technique in which an electric power steering control is substantially inactive from a time when a steering assist control is activated to a time when an override is determined. In the technique of JP-A No. 2017-171224, steering torque by a driver's steering wheel operation detected by a steering torque sensor is compared with steering reaction force torque set by referring to a map or the like based on a steering angle detected by a steering angle sensor and a vehicle speed detected by a vehicle speed sensor, and when the steering torque exceeds the steering reaction force torque, the override is determined.

SUMMARY

An aspect of the technology provides a vehicle steering assist device. The device includes a steering torque detector, an assist steering torque calculator, a target steering torque calculator, an assist steering torque output controller, an electric power steering (EPS) torque setter, and a steering wheel hold detector. The steering torque detector is configured to detect steering torque by a driver's steering wheel operation. The assist steering torque calculator is configured to calculate assist steering torque for the steering torque detected by the steering torque detector. The target steering torque calculator is configured to calculate target steering torque to perform steering control independent of the driver's steering wheel operation. The assist steering torque output controller is configured to switch the assist steering torque calculator from an active state to an inactive state to limit an output of the assist steering torque when the target steering torque calculator is in an active state. The EPS torque setter is configured to set EPS torque to drive an EPS motor on a basis of an output from the target steering torque calculator and an output from the assist steering torque output controller. The steering wheel hold detector is configured to detect a driver's holding state of the steering wheel. Even when the target steering torque calculator is in the active state, when a state in which a driver holds the steering wheel is detected by the steering wheel hold detector, the assist steering torque output controller switches the assist steering torque calculator from the inactive state to the active state.

An aspect of the technology provides a vehicle steering assist device according. The device includes a steering torque detector, a steering wheel hold detector, and circuitry. The steering torque detector is configured to detect steering torque by a driver's steering wheel operation. The steering wheel hold detector is configured to detect a driver's holding state of a steering wheel. The circuitry is configured to perform calculation of assist steering torque for the steering torque detected by the steering torque detector. The circuitry is configured to perform calculation of target steering torque to perform steering control independent of the driver's steering wheel operation. The circuitry is configured to, when the calculation of the target steering torque is in an active state, switch the calculation of the assist steering torque from an active state to an inactive state to perform output control so as to limit an output of the assist steering torque. The circuitry is configured to set electric power steering (EPS) torque to drive an EPS motor on a basis of an output of the target steering torque and the output of the output-controlled assist steering torque. The circuitry is configured to, in the output control of the assist steering torque, even when the target steering torque calculator is in an active state, when a state in which a driver holds the steering wheel is detected by the steering wheel hold detector, switch the calculation of the assist steering torque from the inactive state to the active state.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 5A is a time chart of a torque sensor value detected by a torque sensor.

FIG. 5B is a time chart of a steering angle detected by a steering angle sensor.

FIG. 5C is a time chart of assist steering torque calculated in an assist steering torque calculator.

FIG. 7A is a time chart of a steering wheel hold detection sensor value detected by a steering wheel hold detection sensor.

FIG. 7B is a time chart of a torque sensor value detected by the torque sensor.

FIG. 7C is a time chart of assist steering torque after output control.

FIG. 8A is a time chart of a steering wheel hold detection sensor value detected by the steering wheel hold detection sensor according to a comparative example.

FIG. 8B is a time chart of a torque sensor value detected by the torque sensor according to the comparative example.

FIG. 8C is a time chart of assist steering torque according to the comparative example.

FIG. 8D is a time chart of target steering torque calculated in the target steering torque calculator according to the comparative example.

FIG. 8E is a time chart of a steering angle detected by the steering angle sensor according to the comparative example.

DETAILED DESCRIPTION

When electric power steering control is set to an inactive state from a time at which driving assist control is activated to a time at which an override is determined as in the technology disclosed in JP-A No. 2017-171224, described above, no assist steering torque is generated for a driver's steering wheel operation after the driver starts the steering operation until the override is determined, so that the steering operation becomes temporarily heavy and steering feeling may be degraded.

The technology has been made in view of the above circumstances, and it is desirable to provide a vehicle steering assist device that can achieve both controllability of steering assist control and a driver's steering feeling.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, ALK control will be described as an example of the steering assist control.

Figure 1:
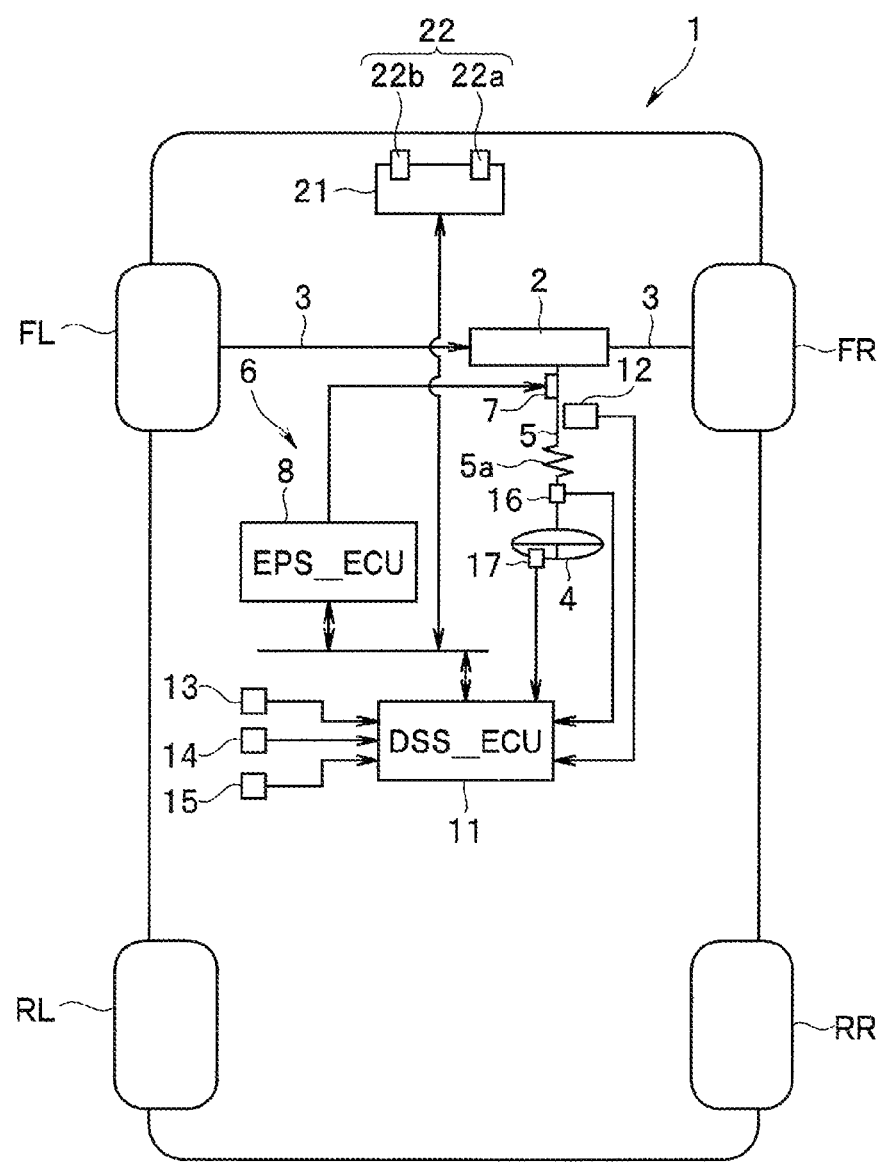
FIG. 1 is a schematic configuration diagram of a vehicle on which a steering assist device is mounted.

In FIG. 1, a vehicle (own vehicle) 1 has right and left front wheels FR and FL and right and left rear wheels RR and RL, and the right and left front wheels FR and FL are drive wheels, and are coupled to a steering mechanism 2 such as a rack and pinion mechanism via tie rods 3. A steering shaft 5 for fixing a steering wheel 4 at the tip end thereof is coupled to the steering mechanism 2. When a driver operates the steering wheel 4, the front wheels FL and FR are steered via the steering mechanism 2.

An electric power steering (EPS) motor 7 of an EPS device 6 is coupled to the steering shaft 5 via a transmission mechanism (not illustrated). The EPS device 6 includes the EPS motor 7 and an EPS control unit (EPS_ECU) 8, and the EPS_ECU 8 controls assist torque (EPS torque) to be applied to the steering shaft 5 by the EPS motor 7. The EPS_ECU 8 is coupled to a DSS_ECU 11 via, for example, an in-vehicle network using controller area network (CAN) communication or the like.

According to a drive signal from the DSS_ECU 11, the EPS_ECU 8 basically sets assist torque for assisting the steering torque applied to the steering wheel 4 by a driver when the steering assist control is in an inactive state. On the other hand, when the ALK control is in an active state, a command signal corresponding to the assist torque set by the DSS_ECU 11 is transmitted to the EPS_ECU 8, and the EPS_ECU 8 generates predetermined assist torque in the EPS motor 7, so that the own vehicle 1 is controlled so as to travel by tracing a target traveling locus (for example, a lane center) described later. Although not illustrated in the drawings, the in-vehicle network includes, in addition to the EPS_ECU 8 and the DSS_ECU 11, units for controlling a traveling state of the own vehicle 1 such as an engine control unit, a transmission control unit, and a S (VDC) unit including brake control, and the like, are coupled to freely communicate with each other, and these control units are mainly configured by a microcomputer having a CPU, a RAM, a ROM, and the like, for example.

The DSS_ECU 11 receives signals from sensors for detecting behavior of the own vehicle 1, as various parameters required for the ALK control, such as a steering angle sensor 12 attached to the steering shaft 5 for detecting a steering angle of the steering wheel 4, a yaw rate sensor 13 for detecting a yaw rate acting on the own vehicle 1, a vehicle speed sensor 14 for detecting a vehicle speed, an EPS motor rotation angle sensor 15 for detecting a rotation angle of the EPS motor 7, a steering torque sensor 16 that detects steering torque applied to the steering wheel 4 by a driver from a torsion angle of a torsion bar 5a interposed in the steering shaft 5, a steering wheel hold detection sensor 17 that is configured by a touch sensor or the like provided on the steering wheel 4 and detects that the driver holds the steering wheel, and the like. In one embodiment, the steering torque sensor 16 may serve as a "steering torque detector", and the steering wheel hold detection sensor 17 may serve as a "steering wheel hold detector".

On the other hand, reference numeral 21 denotes a forward recognizer which is configured mainly by a microcomputer including, for example, a CPU, a RAM, a ROM, and the like, and includes an on-vehicle camera configured by a stereo camera including a main camera 22a and a sub camera 22b, and performs image processing on an image captured by the on-vehicle camera 22 to generate image information required for the ALK control.

Both the two cameras 22a and 22b are disposed in a horizontal state, for example, in the front of the vehicle, at equal distances from the center in the vehicle width direction to the right and left in a position near the windshield. Each of the cameras 22a and 22b is provided with an image pickup device such as a CCD, a CMOS, or the like, and with these two image pickup devices, a three-dimensional image of a traveling environment ahead in a traveling direction including a traveling lane in which the own vehicle is traveling is captured. In the embodiment, based on the image data captured by the on-vehicle camera 22, the traveling lane of the own vehicle 1, three-dimensional objects including a preceding vehicle, an obstacle, and the like are recognized. Accordingly, as long as these can be recognized, a millimeter-wave radar, an infrared laser radar, or the like may be used instead of the on-vehicle camera 22, and further, a combination therewith may be used.

The forward recognizer 21 converts a pair of analog images captured by respective cameras 22a and 22b into digital images having predetermined luminance gradation, generates reference image data from an output signal of the main camera 22a, and generates comparison image data from an output signal of the sub cameras 22b. Based on a parallax between the reference image data and the comparison image data, three-dimensional information of the same object in both the images, that is, a distance from the own vehicle to the object is calculated. The forward recognizer 21 recognizes right and left lane markers based on the generated image data, and calculates a width (lane width) W between the lane markers. The on-vehicle camera 22 may be a monocular camera, and in this case, the three-dimensional information may be obtained by using a well-known motion stereo method or the like.

Figure 2:
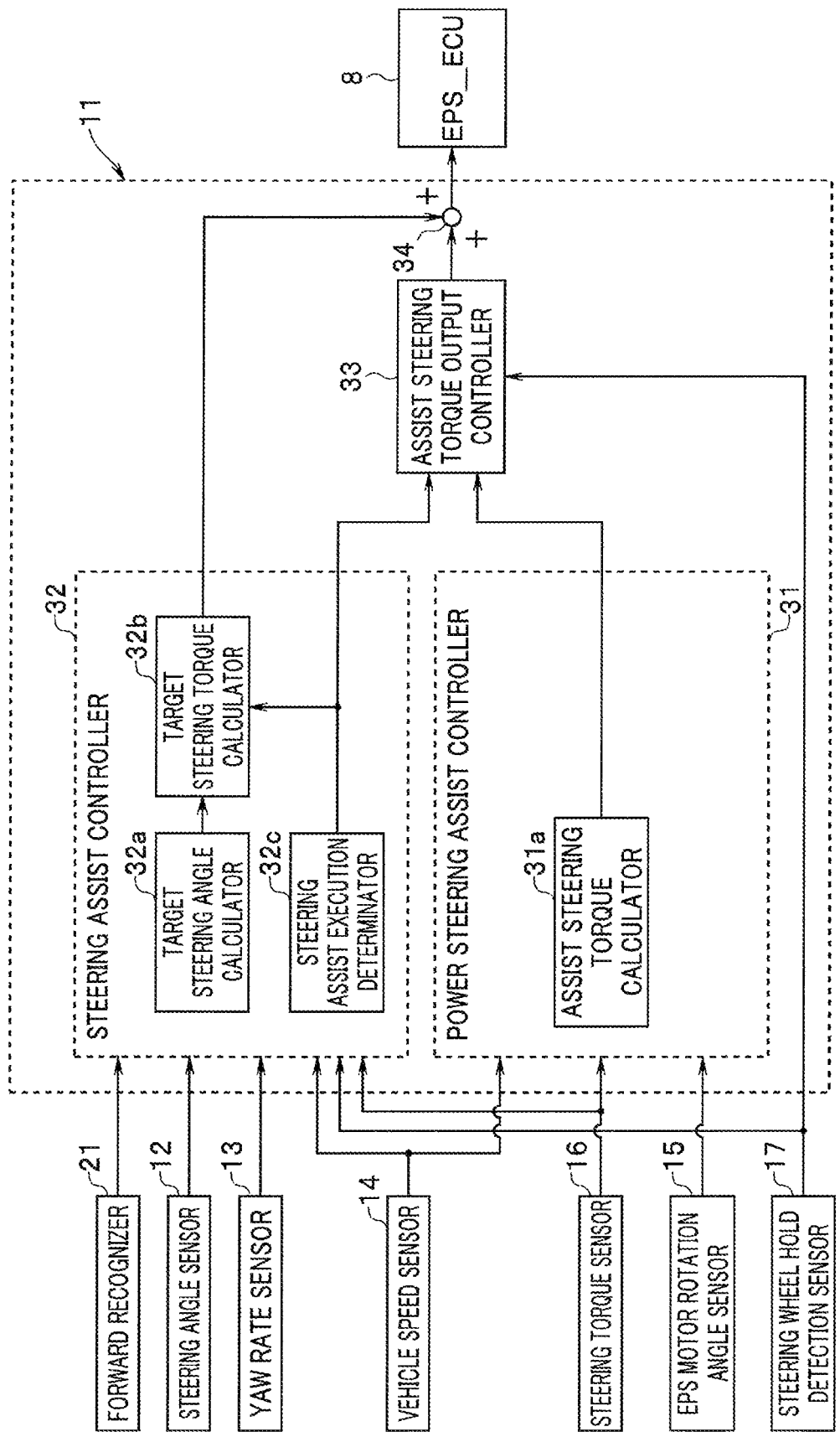
FIG. 2 is a functional block diagram of the steering assist device.

As illustrated in FIG. 2, the DSS_ECU 11 includes, to perform the ALK control, a power steering assist controller (hereinafter referred to as "PSA controller") 31, a steering assist controller 32, an assist steering torque output controller 33, and a torque adder 34. In one embodiment, the torque adder 34 may serves as an "electric power steering (EPS) torque setter".

The PSA controller 31 is configured to include an assist steering torque calculator 31a. On the other hand, the steering assist controller 32 is configured to include a target steering angle calculator 32a, a target steering torque calculator 32b, and a steering assist execution determinator 32c.

The assist steering torque calculator 31a of the PSA controller 31 calculates assist steering torque as an assist control amount corresponding to a driver's steering wheel operation based on the vehicle speed of the own vehicle 1 detected by the vehicle speed sensor 14, the steering torque (torque sensor value) detected by the steering torque sensor 16, and the rotation angle of the EPS motor 7 detected by the EPS motor rotation angle sensor 15.

The steering assist controller 32 performs steering assist control (ALK control) so that the own vehicle 1 travels along the target traveling locus set in the traveling lane ahead of the own vehicle 1, and the target steering angle calculator 32a calculates a target steering angle required for the own vehicle 1 to travel along the target traveling locus based on the image data from the forward recognizer 21, the vehicle speed of the own vehicle 1 detected by the vehicle speed sensor 14, and the yaw rate detected by the yaw rate sensor 13.

The target steering torque calculator 32b calculates target steering torque for driving the EPS motor 7 in response to the target steering angle calculated in the target steering angle calculator 32a.

For example, when a driver turns on a steering assist control switch (not illustrated) provided on the steering wheel 4, the steering assist execution determinator 32c determines that an execution of the steering assist control (ALK control) is started. On the other hand, when the steering wheel hold detection sensor 17 detects that the steering wheel 4 is held by a driver during the execution of the steering assist control, the steering assist execution determinator 32c compares the steering torque associated with the driver's steering wheel operation detected by the steering torque sensor 16 with the steering reaction force torque set based on the steering angle detected by the steering angle sensor 12 and the vehicle speed detected by the vehicle speed sensor 14. When the steering torque exceeds the steering reaction force torque, it is determined that the execution of the steering assist control (ALK control) is prohibited by determining the override.

On the other hand, the assist steering torque output controller 33 checks whether the ALK control is being performed or whether the steering wheel 4 is being held by the driver even during the ALK control, and based on those results, sets the assist steering torque to active or inactive.

Since the calculations in the assist steering torque calculator 31a, the target steering angle calculator 32a, the target steering torque calculator 32b, and the steering assist execution determinator 32c are well known in the art, a detailed description thereof will be omitted.

Figure 3:
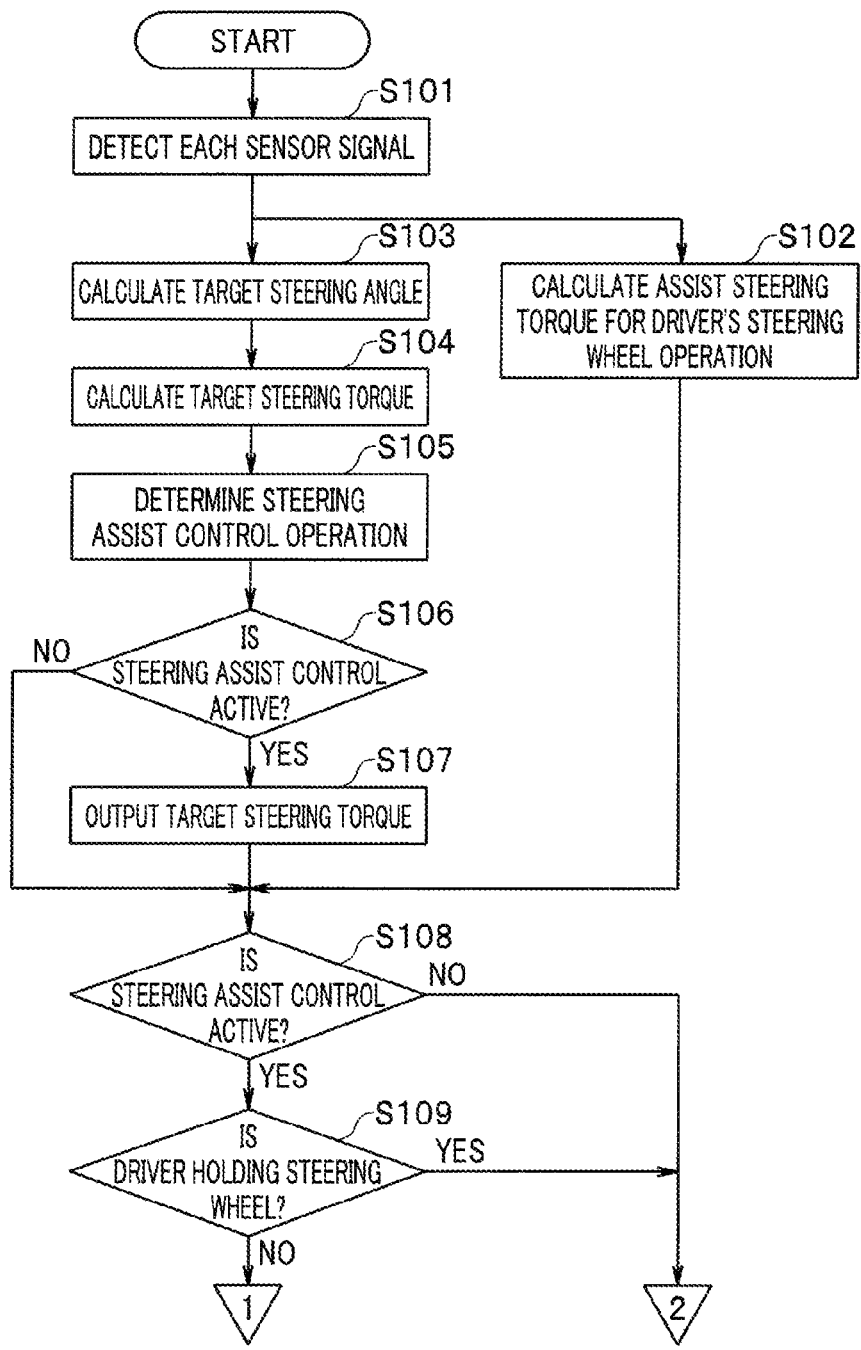
FIG. 3 is a flowchart illustrating an EPS torque setting routine (part 1).
Figure 4:
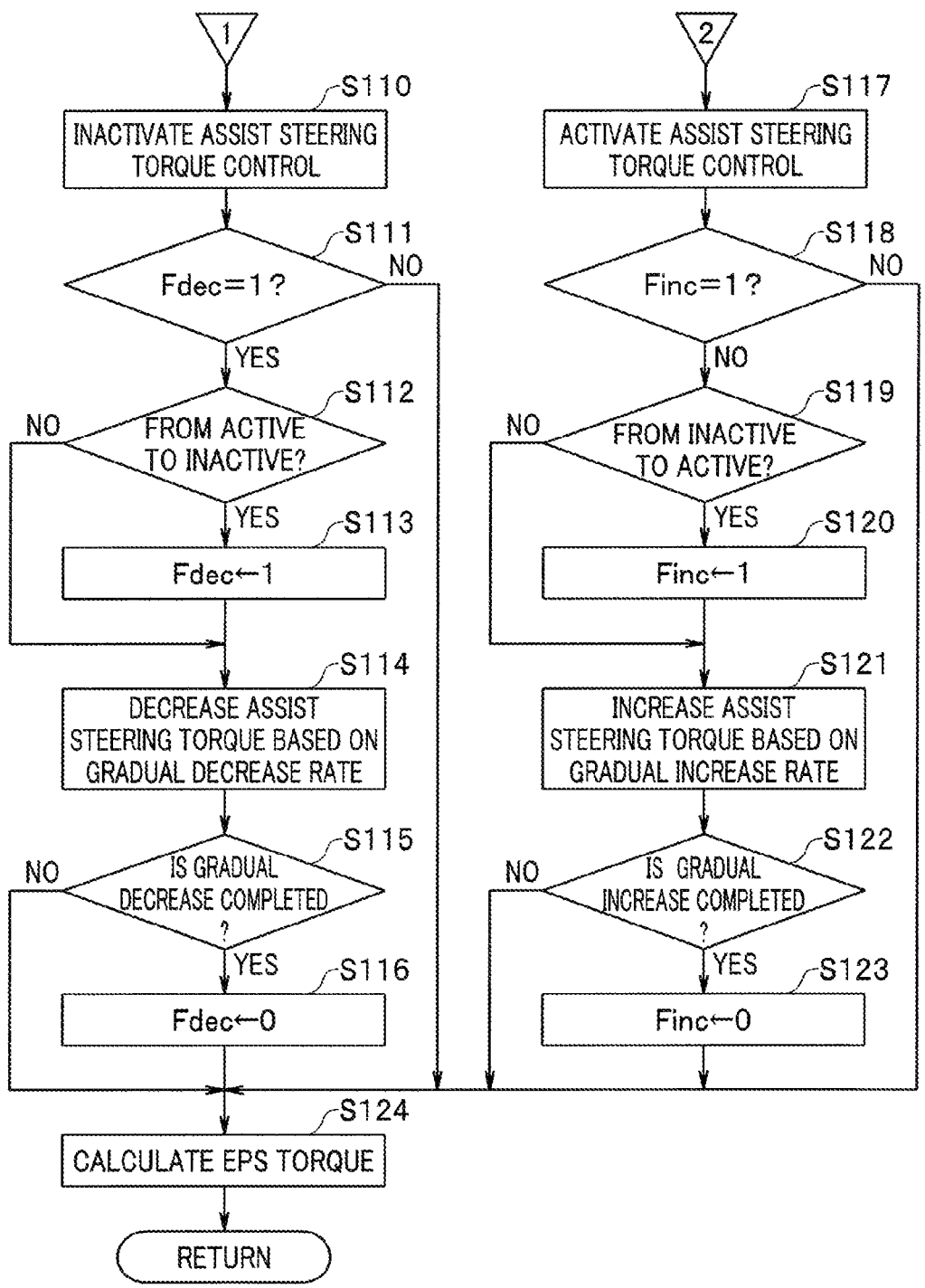
FIG. 4 is the flowchart illustrating the EPS torque setting routine (part 2).
Figure 6A:
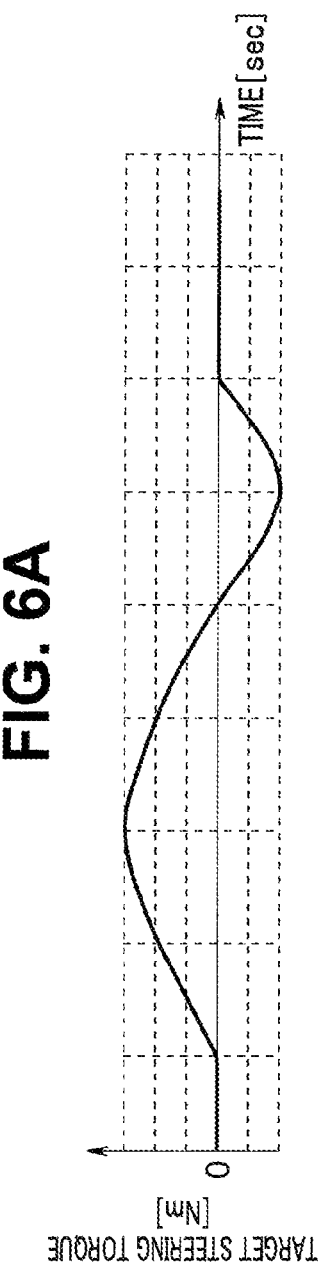
FIG. 6A is a time chart of target steering torque calculated in a target steering torque calculator.
Figure 6B:
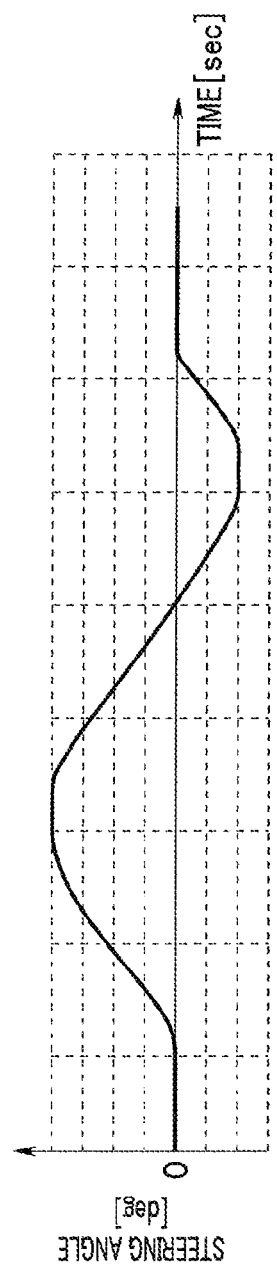
FIG. 6B is a time chart of a steering angle detected by the steering angle sensor.
Figure 6C:
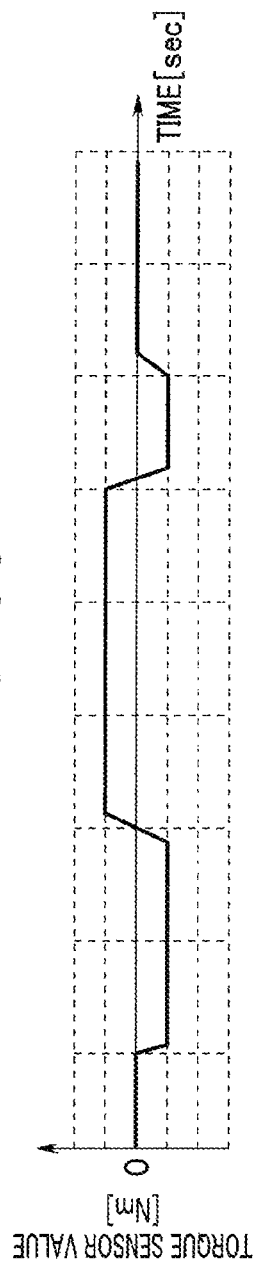
FIG. 6C is a time chart of a torque sensor value detected by the torque sensor.
Figure 6D:
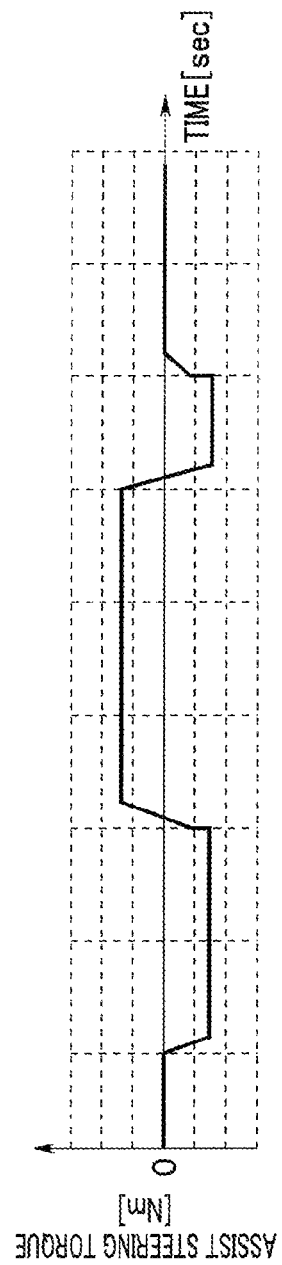
FIG. 6D is a time chart of assist steering torque calculated in the assist steering torque calculator.

In one embodiment, the EPS torque set in the DSS_ECU 11 is set according to an EPS torque setting routine illustrated in FIGS. 3 and 4.

The routine is repeatedly executed at every set time, and when the routine starts, the DSS_ECU 11 first detects parameters required for calculating the EPS torque from the sensor signals from the sensors 12 to 17.

Next, the process proceeds to step S102, in which the DSS_ECU 11 calculates the assist steering torque for the driver's steering wheel operation based on, for example, the vehicle speed of the own vehicle 1 detected by the vehicle speed sensor 14, the steering torque detected by the steering torque sensor 16, and the rotation angle of the EPS motor 7 detected by the EPS motor rotation angle sensor 15. Step S102 corresponds to the process executed in the assist steering torque calculator 31a.

On the other hand, the process proceeds from step S101 to step S103, and the DSS_ECU 11 estimates the traveling state of the own vehicle 1 based on the steering angle detected by the steering angle sensor 12, the yaw rate detected by the yaw rate sensor 13, and the vehicle speed detected by the vehicle speed sensor 14, and estimates the traveling lane state ahead of the own vehicle 1 based on the image data acquired by the forward recognizer 21. The DSS_ECU 11 calculates the target steering angle based on the traveling state of the own vehicle 1 and the traveling lane state ahead of the own vehicle 1. Step S103 corresponds to the process executed in the target steering angle calculator 32a.

Next, the process proceeds to step S104, and the DSS_ECU 11 calculates the target steering torque for converging the steering angle detected by the steering angle sensor 12 to the target steering angle by, for example, feedback control or the like. Step S104 corresponds to the process executed in the target steering torque calculator 32b.

Next, the process proceeds to step S105, and the DSS_ECU 11 determines the operation of the steering assist control. That is, for example, when a driver turns on the steering assist control switch provided on the steering wheel 4, the DSS_ECU 11 determines to start the execution of the steering assist control (determines to activate the driving assist control). On the other hand, when the steering wheel hold detection sensor 17 detects that the steering wheel 4 is held by a driver during the execution of the steering assist control, the DSS_ECU 11 compares the steering torque associated with the driver's steering wheel operation detected by the steering torque sensor 16 with the steering reaction force torque set based on the steering angle detected by the steering angle sensor 12 and the vehicle speed detected by the vehicle speed sensor 14. When the steering torque exceeds the steering reaction force torque, it is determined that the execution of the steering assist control is prohibited (determined that the driving assist control is in inactive state) by determining the override. Step S105 corresponds to the process executed by the steering assist execution determinator 32c.

Next, the process proceeds to step S106, and the DSS_ECU 11 determines whether the steering assist control is currently in the active state.

When the DSS_ECU 11 determines in step S106 that the steering assist control is not in the active state, the process jumps to step S108.

On the other hand, when the DSS_ECU 11 determines in step S106 that the steering assist control is in the active state, the process proceeds to step S107, and after the target steering torque calculated in step S104 is output, proceeds to step S108. Steps S104, S106, and S107 correspond to the processes performed in the target steering torque calculator 32b.

The process proceeds from step S102, step S106, or step S107 to step S108, and the DSS_ECU 11 determines whether the steering assist control is currently in the active state based on the determination in step S105 described above.

When the DSS_ECU 11 determines in step S108 that the steering assist control is not in the active state, the process proceeds to step S117.

On the other hand, when the DSS_ECU 11 determines in step S108 that the steering assist control is in the active state, the process proceeds to step S109, and based on the signal from the steering wheel hold detection sensor 17, it is checked whether the driver is currently holding the steering wheel 4. Steps S108 to S123 described below correspond to the processes executed in the assist steering torque output controller 33.

In step S109, the process proceeds to step S117 when the DSS_ECU 11 determines that the driver is holding the steering wheel, and the process proceeds to step S110 when the DSS_ECU 11 determines that the driver is not holding the steering wheel.

When the process proceeds from step S109 to step S110, the DSS_ECU 11 inactivates the assist steering torque control by, for example, prohibiting an input of the assist steering torque from the assist steering torque calculator 31a to the assist steering torque output controller 33.

Next, the process proceeds to step S111, and the DSS_ECU 11 checks whether a flag Fdec for gradually decreasing the assist steering torque to be output is set to "1" during transition after the assist steering torque control is in the inactive state.

In step S111, when the DSS_ECU 11 determines that the flag Fdec is set to "1", the process proceeds to step S112, and when the DSS_ECU 11 determines that the flag Fdec is cleared to "0", the process jumps to step S124.

When the process proceeds from step S111 to step S112, the DSS_ECU 11 checks whether the assist steering torque control is switched from the active state to the inactive state.

When the DSS_ECU 11 determines in step S112 that it is not after switching to the inactive state, the process jumps to step S114.

On the other hand, when the DSS_ECU 11 determines in step S112 that it is after switching to the inactive state, the process proceeds to step S113, and after the flag Fdec is set to "1", proceeds to step S114.

When the process proceeds from step S112 or step S113 to step S114, the DSS_ECU 11 performs a gradual decrease process for decreasing the previous assist steering torque using a preset gradual decrease rate.

Next, in step S115, the DSS_ECU 11 checks whether the gradual decrease process for the assist steering torque is completed.

When the DSS_ECU 11 determines in step S115 that the gradual decrease process is not completed, the process jumps to step S124.

On the other hand, when the DSS_ECU 11 determines in step S115 that the gradual decrease process is completed, the process proceeds to step S116, and after the flag Fdec is cleared to "0", proceeds to step S124. In this determination, for example, when the assist steering torque becomes zero, it is determined that the gradual decrease process is completed.

When the process proceeds from step S108 or step S109 to step S117, the DSS_ECU 11 activates the assist steering torque control by, for example, permitting the input of the assist steering torque from the assist steering torque calculator 31a to the assist steering torque output controller 33.

Next, the process proceeds to step S118, and the DSS_ECU 11 checks whether a flag Finc for gradually increasing the assist steering torque to be output is set to "1" during transition after the assist steering torque control is in the activate state.

In step S118, when the DSS_ECU 11 determines that a flag Finc is set to "1", the process proceeds to step S119, and when the DSS_ECU 11 determines that the flag Finc is cleared to "0", the process jumps to step S124.

When the process proceeds from step S118 to step S119, the DSS_ECU 11 checks whether the assist steering torque control is switched from the inactive state to the active state.

When the DSS_ECU 11 determines in step S119 that it is not after switching to the active state, the process jumps to step S121.

On the other hand, when the DSS_ECU 11 determines in step S119 that it is after switching to the active state, the process proceeds to step S120, and after the flag Finc is set to "1", proceeds to step S121.

When the process proceeds from step S119 or step S120 to step S121, the DSS_ECU 11 performs a gradual increase process of increasing the previous assist steering torque using a preset gradual increase rate.

Next, in step S122, the DSS_ECU 11 checks whether the gradual increase process for the assist steering torque is completed.

When the DSS_ECU 11 determines in step S122 that the gradual increase process is not completed, the process jumps to step S124.

On the other hand, when the DSS_ECU 11 determines in step S122 that the gradual increase process is completed, the process proceeds to step S123, and after the flag Finc is cleared to "0", proceeds to step S124. In this determination, for example, when the assist steering torque increased gradually matches the assist steering torque input from the assist steering torque calculator 31a, it is determined that the gradual increase process is completed.

When the process proceeds from step S111, step S115, step S116, step S118, step S122, or step S123 to step S124, the DSS_ECU 11 outputs a value obtained by adding the target steering torque output from the target steering torque calculator 32b and the assist steering torque output from the assist steering torque output controller 33 as a final assist torque (EPS torque) and then, the process exits the routine. Step S124 corresponds to the process performed in the torque adder 34.

That is, when the process proceeds from step S111 to step S124, the target steering torque output from the target steering torque calculator 32b is output as it is as the EPS torque.

When the process proceeds from step S116 to step S124, a value obtained by adding a value obtained by gradually decreasing the assist steering torque immediately before the assist steering torque control becomes inactive to the target steering torque output from the target steering torque calculator 32b is output as the EPS torque.

When the process proceeds from step S115 to step S124, a value obtained by adding a value obtained by gradually decreasing the previous assist steering torque to the target steering torque output from the target steering torque calculator 32b is output as the EPS torque.

When the process proceeds from step S118 to step S124, a value obtained by adding the assist steering torque output from the assist steering torque calculator 31a to the target steering torque output from the target steering torque calculator 32b is output as the EPS torque.

When the process proceeds from step S123 to step S124, a value obtained by gradually increasing the assist steering torque (=zero) to the target steering torque output from the target steering torque calculator 32b is output as the EPS torque.

When the process proceeds from step S122 to step S124, a value obtained by subtracting a value obtained by gradually increasing the previous assist steering torque from the target steering torque output from the target steering torque calculator 32b is output as the EPS torque.

Next, each torque set in the above-described EPS torque setting routine will be described with reference to FIGS. 5A to 7E.

For example, when the target steering torque calculator 32b is in the inactive state, the assist steering torque calculator 31a calculates the assist steering torque (see FIG. 5C) in response to the steering torque (torque sensor value: see FIG. 5A) and the steering angle (see FIG. 5B) by a driver.

For example, when the target steering torque calculator 32b is in the active state, the target steering torque calculator 32b calculates the target steering torque (see FIG. 6A) for causing the steering angle (see FIG. 6B) detected by the steering angle sensor to converge to the target steering angle. When the steering is controlled by the target steering torque, the steering torque sensor 16 detects the steering torque (torque sensor value) in a direction opposite to the steering direction by the steering assist control under an influence of a static friction force of the steering system (see FIG. 6C). Thus, the assist steering torque calculator 31a calculates the assist steering torque in a direction to cancel the target steering torque (see FIG. 6D).

In the embodiment, as described above, an output control in the assist steering torque output controller 33 is performed on the assist steering torque calculated in the assist steering torque calculator 31a, so that both controllability of steering assist control and the driver's steering feeling can be achieved.

That is, for example, in a section from a timing t1 to a timing t2 in which the steering wheel 4 is held by a driver (see FIG. 7A) and the target steering torque calculator 32b is in the inactive state, the assist steering torque calculated in the assist steering torque calculator 31a in response to the steering torque (see FIG. 7B) detected by the steering torque sensor 16 is output as it is as the assist steering torque after the output control (see FIG. 7C).

Figure 7D:
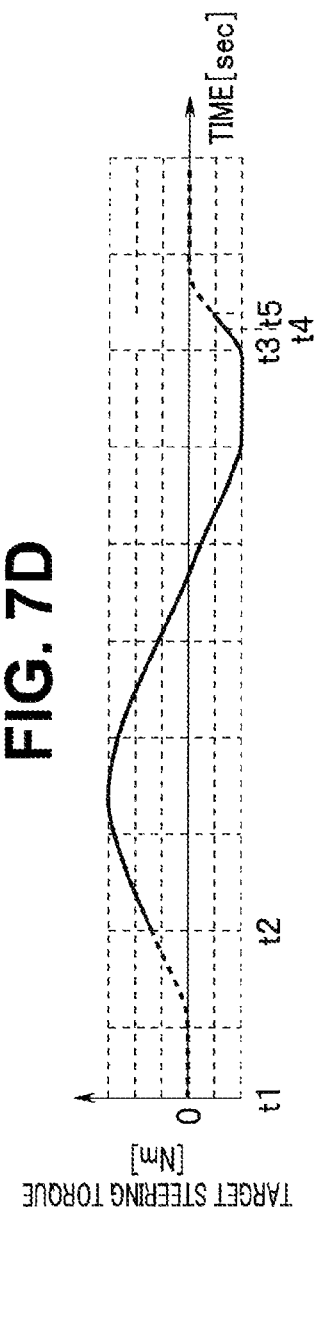
FIG. 7D is a time chart of target steering torque calculated in the target steering torque calculator.

In a section from the timing t2 to a timing t3 in which driver's hands are released from the steering wheel 4 (see FIG. 7A) and the target steering torque calculator 32b is in the active state (see FIG. 7D), the assist steering torque calculator 31a enters the inactive state, and the assist steering torque after the output control is maintained at zero after the gradual decrease process is performed (see FIG. 7C). Thus, interference between the target steering torque and the assist steering torque can be prevented, and the controllability of the steering assist control can be improved.

When the target steering torque calculator 32b is in the active state (see FIG. 7D), at the timing t3 at which the steering wheel 4 is held by a driver (see FIG. 7A), the assist steering torque calculator 31a is again in the active state, and the assist steering torque after the output control is gradually increased to the assist steering torque calculated in the assist steering torque calculator 31a (see the timing t3 to a timing t4). After the subsequent timing t4, the assist steering torque calculated in the assist steering torque calculator 31a is output as it is as the assist steering torque after the output control (see the timing t4 and thereafter). Thus, even when a driver steers the steering wheel 4, the heavy temporary steering wheel operation load due to no output of the assist steering torque is eliminated.

When the override is determined (see a timing t5), the target steering torque enters in the inactive state.

Figure 7E:
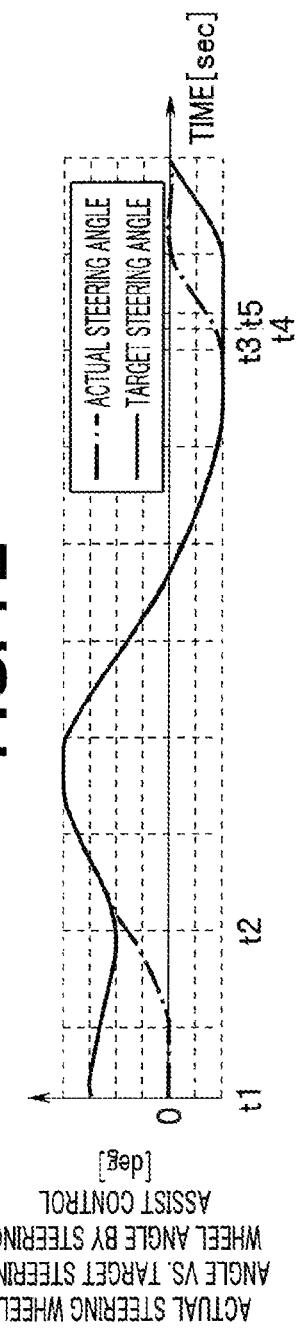
FIG. 7E is a time chart of a steering angle detected by the steering angle sensor.

As illustrated in a comparative example of FIGS. 8A to 8E, when the assist steering torque is output as it is, the target steering torque and the assist steering torque interfere during the steering assist control. The "actual steering angle" referred to in FIG. 7E and FIG. 8E is a steering angle detected by the steering angle sensor. The "target steering angle" referred to in FIG. 7E and FIG. 8E is a target steering angle calculated by the target steering angle calculator 32a.

According to the embodiment described above, when the target steering torque calculator 32b is in the active state, while the assist steering torque output controller 33 switches the assist steering torque calculator 31a from the active state to the inactive state to limit the output of the assist steering torque, even when the target steering torque calculator 32b is in the active state, when a state in which a driver holds the steering wheel 4 is detected, by switching the assist steering torque calculator 31a from the inactive state to the active state by the assist steering torque output controller 33, it is possible to achieve both the controllability of the steering assist control and the driver's steering feeling.

The EPS_ECU 8, the DSS_ECU 11, and the forward recognizer 21 provided in the vehicle 1 as illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the EPS_ECU 8, the DSS_ECU 11 including the power steering assist controller 31 (including the assist torque calculator 31*a*), and the steering support controller 32 (including the target steering angle calculator 32*a*, the target steering torque calculator 32*b*, and the steering assist execution determinator 32*c*), and the forward recognizer 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

In one embodiment, in a case the assist steering torque calculator 31*a* is in the inactive state, the steering assist execution determinator 32*c* may switch the target steering torque calculator 32*b* from the inactive state to the active state when the steering torque equal to or greater than a preset value is detected by the steering torque sensor 16 after lapse of a set time in a state in which the driver holds the steering wheel 4.

Although an embodiment of the technology has been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle steering assist device comprising:
   a steering torque detector configured to detect steering torque by a driver's steering wheel operation;
   a steering wheel hold detector provided on a steering wheel and configured to detect a driver's holding state of the steering wheel;
   at least one machine readable medium storing instructions; and
   at least one processor configured to execute the instructions to:
   calculate assist steering torque for the steering torque detected by the steering torque detector; and
   calculate target steering torque to perform steering control independent of the driver's steering wheel operation;
   set an electric power steering (EPS) torque to drive an EPS motor on a basis of the target steering torque and the assist steering torque,
   wherein the at least one processor is configured to execute the instructions to:
   in a case where the calculation of the target steering torque is an active state, i) determine whether the steering wheel hold detector detects the driver holding the steering wheel and ii) determine whether the steering torque is equal to or greater than a preset value;
   in response to determining that i) the steering wheel hold detector does not detect the driver holding the steering wheel and ii) the steering torque is less than the preset value, maintain the calculation of the target steering torque in the active state and set the calculation of the assist steering torque in an inactive state;
   in response to determining that i) the steering wheel hold detector detects the driver holding the steering wheel and ii) the steering torque is less than the preset value, maintain the calculation of the target steering torque in the active state and set the calculation of the assist steering torque in an active state; and
   in response to determining that i) the steering wheel hold detector detects the driver holding the steering wheel and ii) the steering torque is equal to or more than the preset value, switch the calculation of the target steering torque from the active state to an inactive state and set the calculation of the assist steering torque in the active state.

2. The vehicle steering assist device according to claim 1, wherein
   the at least one processor is configured to execute the instructions to gradually decrease the assist steering torque to zero when the calculation of the assist steering torque is switched from the active state to the inactive state, and gradually increase the assist steering torque from zero when the calculation of the assist steering torque switches from the inactive state to the active state.

3. A vehicle steering assist device comprising:
   a steering torque detector configured to detect steering torque by a driver's steering wheel operation;
   a steering wheel hold detector provided on a steering wheel and configured to detect a driver's holding state of the steering wheel; and
   circuitry configured to
   performs calculation of assist steering torque for the steering torque detected by the steering torque detector;
   perform calculation of target steering torque to perform steering control independent of the driver's steering wheel operation;
   set electric power steering (EPS) torque to drive an EPS motor on a basis of the target steering torque and the assist steering torque
   wherein the circuitry is configured to:
   in a case where the calculation of the target steering torque is in an active state, i) determine whether the driver holds the steering wheel is detected by the steering wheel hold detector and ii) determine whether the steering torque is equal to or greater than a preset value;
   in response to determining that i) the steering wheel hold detector does not detect the driver holding the steering wheel and ii) the steering torque is less than the preset value, maintain the calculation of the target steering torque in the active state and set the calculation of the assist steering torque in an inactive state;
   in response to determining that i) the steering wheel hold detector detects the driver holding the steering wheel and ii) the steering torque is less than the preset value, maintain the calculation of the target steering torque in the active state and set the calculation of the assist steering torque in an active state; and
   in response to determining that i) the steering wheel hold detector detects the driver holding the steering wheel and ii) the steering torque is equal to or more than the preset value, switch the calculation of the target steering torque from the active state to an inactive state and set the calculation of the assist steering torque.

\* \* \* \* \*